(12) United States Patent
Lo

(10) Patent No.: US 8,208,383 B2
(45) Date of Patent: Jun. 26, 2012

(54) MODEM AND METHOD OF CONNECTING A COMPUTER TO THE INTERNET USING THE MODEM

(75) Inventor: Yew-Min Lo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 236 days.

(21) Appl. No.: 12/632,916

(22) Filed: Dec. 8, 2009

(65) Prior Publication Data

US 2011/0063981 A1 Mar. 17, 2011

(30) Foreign Application Priority Data

Sep. 14, 2009 (CN) .......................... 2009 1 0306955

(51) Int. Cl.
*G08C 15/00* (2006.01)
(52) U.S. Cl. ......... 370/241; 709/221; 709/237; 709/245
(58) Field of Classification Search .................. 370/241; 709/220, 221, 230, 237, 245, 246
See application file for complete search history.

(56) References Cited

U.S. PATENT DOCUMENTS

| 2002/0073338 | A1* | 6/2002 | Burrows et al. | 713/201 |
| 2003/0106067 | A1* | 6/2003 | Hoskins et al. | 725/119 |
| 2006/0059552 | A1* | 3/2006 | Aoki et al. | 726/13 |

* cited by examiner

*Primary Examiner* — Luat Phung
(74) *Attorney, Agent, or Firm* — Altis Law Group, Inc.

(57) ABSTRACT

A method for connecting a computer to the Internet checks if an original media control access (MAC) address in a received data packet is identical with a MAC address of a certain computer that has been allocated an IP address. If the original MAC address in the received data packet is not identical with the MAC address of the certain computer, the method sends an address resolution protocol (ARP) request to detect if the certain computer is shut down. If the certain computer is shut down, the method replaces the original MAC address in the received data packet by the MAC address of the certain computer, so as to connect the computer that sends the received data packet to the Internet using the IP address of the certain computer.

9 Claims, 3 Drawing Sheets

MODEM AND METHOD OF CONNECTING A COMPUTER TO THE INTERNET USING THE MODEM

BACKGROUND

1. Technical Field

Embodiments of the present disclosure relates to wireless communication methods, and more particularly, to a modem and a method of connecting a computer to the Internet using the modem.

2. Description of Related Art

Generally, the number of personal computers (PC) that can access the Internet through a modem is limited to the maximum customer premise equipment (CPE) assigned to the modem. For example, when the maximum CPE is set to one, then a media access control (MAC) address of the one PC is identified by the modem, and the modem only transmits data packets with the identified MAC address. Even if the PC is shut down and an Internet protocol (IP) address allocated to the PC is idle, data packets sent by other PCs with MAC addresses different from the identified MAC address will be dropped by the modem, so that other PCs have to apply unique IP addresses for connecting to the Internet, which is costly. Since the IP addresses are a limited network resource, the more IP addresses allocated, the less IP addresses are available.

What is needed, therefore, is an improved method to overcome the aforementioned problem.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
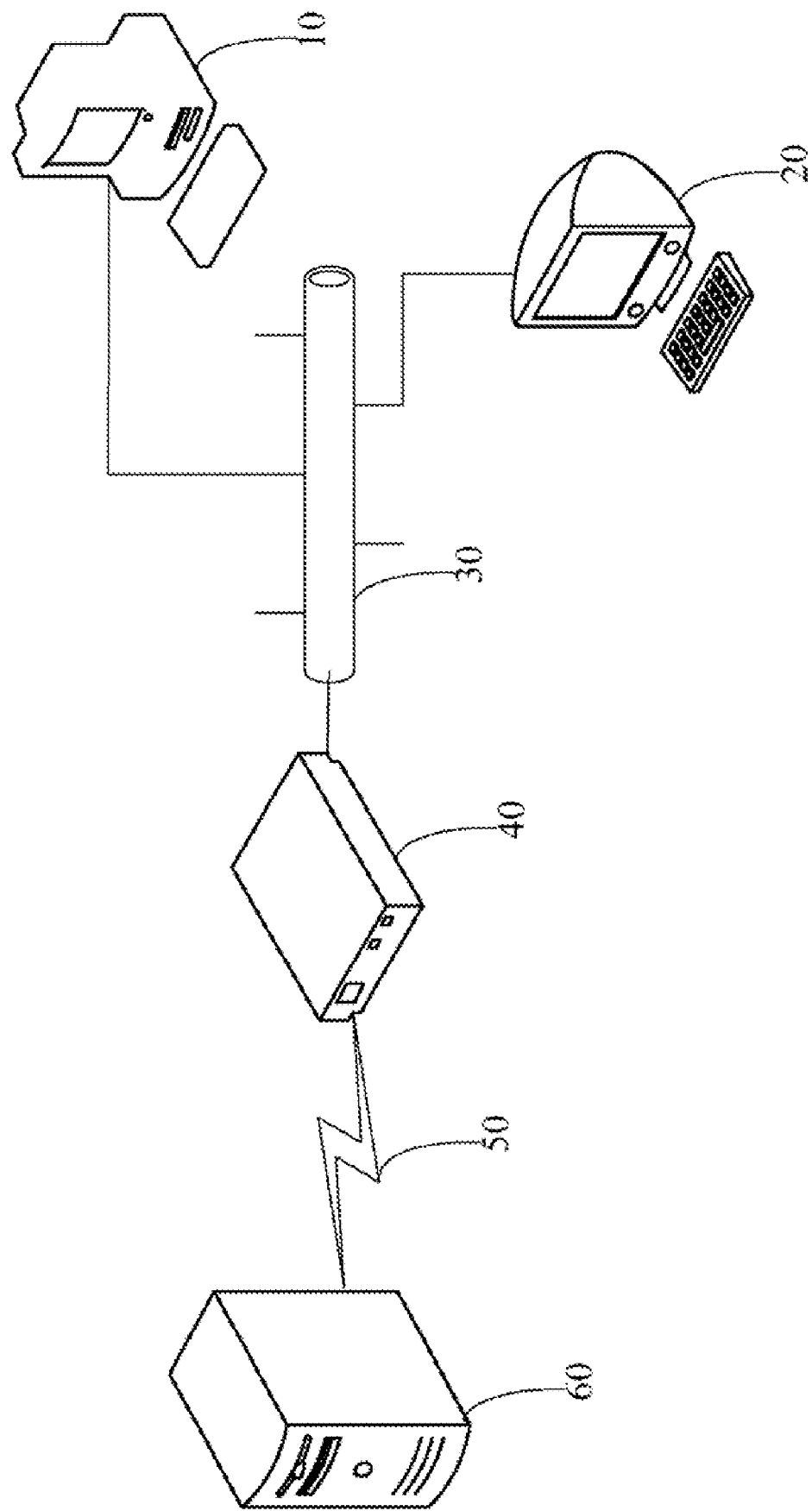
FIG. 1 is a block diagram of one embodiment of an application environment of a modem.

FIG. 1 is a block diagram of one embodiment of an application environment of a modem 40. In one embodiment, more than one customer premise equipment (CPE), such as two computers 10 and 20 are connected to the modem 40 via Ethernet 30. The modem 40 communicates with a network server 60 via the Internet 50. Depending on the embodiment, the modem 40 may be an asymmetric digital subscriber line (ADSL) modem, a symmetric digital subscriber line (SDSL) modem, or a cable modem.

In this embodiment, the computer 10 has been allocated an IP address by the network server 60, and a media access control (MAC) address of the computer 10 can be identified by the modem 40. It is understood that, during a lease duration of the IP address, the computer 10 will send a data packet to the modem 40 and a request to transmit the data packet to the network server 60, in order to continue to use the IP address to log on the Internet 50. The modem 40 is also responsible for transmitting data between the computer 10 and other network devices in the Internet 50.

Figure 2:
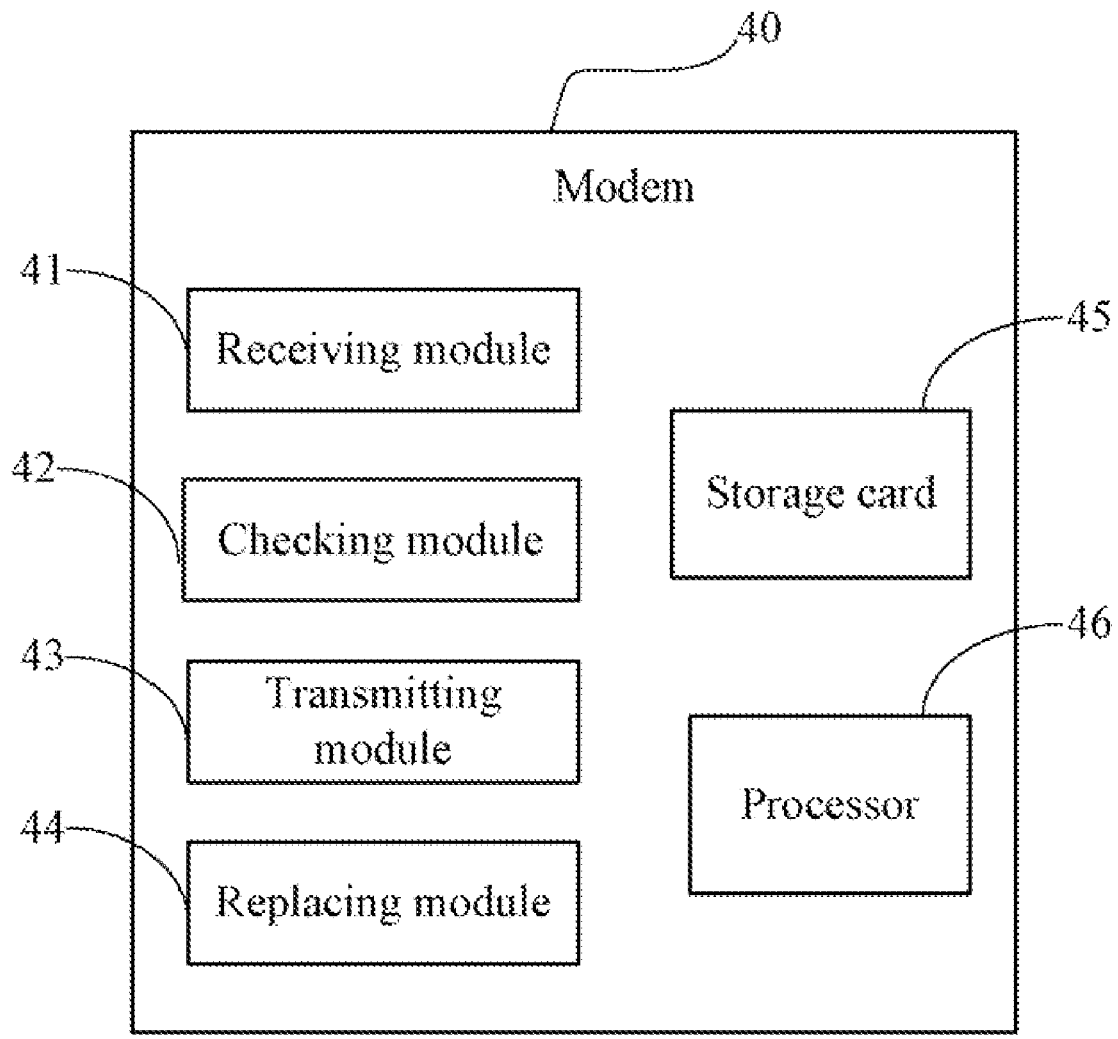
FIG. 2 is a block diagram of one embodiment of function modules of the modem in FIG. 1.

As shown in FIG. 2, the modem 40 includes a plurality of function modules, such as a receiving module 41, a checking module 42, a transmitting module 43, and a replacing module 44. One or more computerized codes of the modules 41-44 are stored in a storage card 45, where a processor 46 executes the computerized codes, to provide one or more operations of the modem 40, so that if the computer 10 is shut down, other CPE, such as the computer 20 that has not been allocated an IP address can be connected to the Internet 50 using the IP address of the computer 10. Depending on the embodiment, the storage card 45 may be a smart media card, a secure digital card, or a compact flash card.

The receiving module 41 receives data packets sent from one or more CPE, such as the computer 10 or 20.

The checking module 42 checks if an original MAC address in a received data packet is identical with the MAC address of the computer 10. Generally speaking, a data packet may include two MAC addresses, one often called an original MAC address, which represents a physical address of a device (e.g., the computer 10 or 20) that sends the data packet, and the other often called an aim MAC address, which represents a physical address of a device (e.g., the network server 60) to which the data packet is sent.

If the original MAC address is identical with the MAC address of the computer 10, the checking module 42 determines the received data packet is sent by the computer 10, which has been allocated with an IP address, so that the transmitting module 43 transmits the received data packet to Internet 50 for processing. Otherwise, if the original MAC address is not identical with the MAC address of the computer 10, the transmitting module 43 transmits an address resolution protocol (ARP) data packet, to detect if the computer 10 is shutdown.

If the checking module 42 detects that an ARP reply data packet is received from the computer 10, which indicates that the computer 10 is in a normal work status, the checking module 42 will drop the received data packet since the modem 40 has to service the computer 10 that has been allocated the IP address. If no ARP reply data packet is received from the computer 10, which indicates that the computer 10 is shut down, the replacing module 44 replaces the original MAC address in the received data packet with the MAC address of the computer 10, then the transmitting module 43 transmits the received data packet to the network server 60. The network server 60 regards the received data packet is sent by the computer 10 that has been allocated the IP address, because the replaced original MAC address is identical the MAC address of the computer 10. As a result, the CPE, such as the computer 20 that actually sends the received data packet is connected to the Internet 50 using the IP address of the computer 10.

Figure 3:
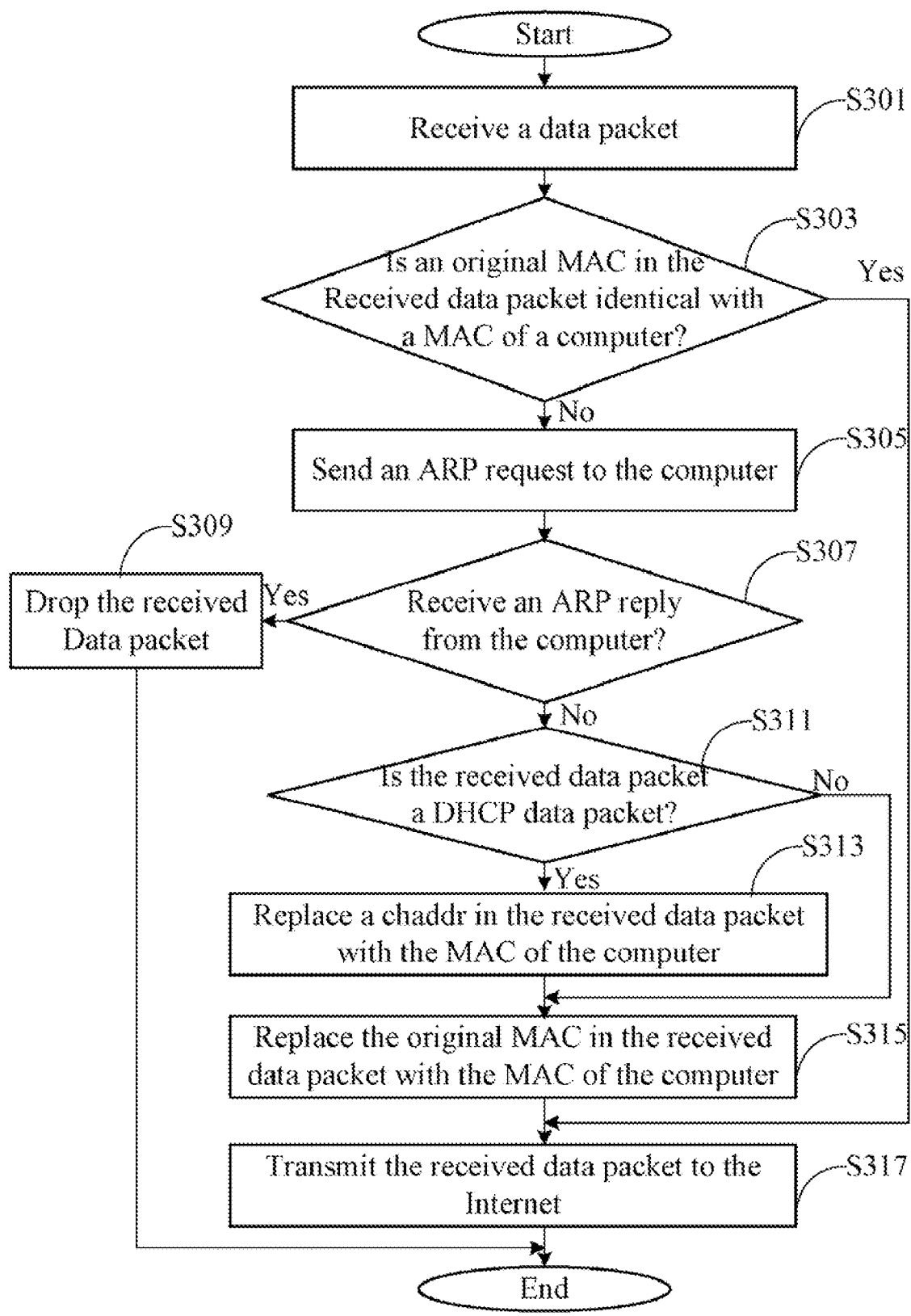
FIG. 3 is a flowchart of one embodiment of a method for connecting a computer to the Internet using the modem in FIG. 2.

FIG. 3 is a flowchart of one embodiment of a method for connecting a computer to a network using the modem 40 in FIG. 2. Depending on the embodiment, additional blocks may be added, others removed, and the ordering of the blocks may be changed.

In block S301, the receiving module 41 receives a data packet from the Ethernet 30. The data packet may be a dynamic host configuration protocol (DHCP) data packet, or a ARP data packet, for example.

In block S303, the checking module 42 checks if an original MAC address in the received data packet is identical with the MAC address of the computer 10 that can be identified by the modem 40. For example, the MAC address of the computer 10 may be "00D059AB0301." If the original MAC address in the received data packet is identical with the MAC address of the computer 10, block S317 is implemented, the checking module 42 determines the received data packet is sent by the computer 10, then the transmitting module 43 transmits the received data packet to the network server 60 for processing. Otherwise, if the original MAC address in the received data packet is not identical with the MAC address of the computer 10, the checking module 42 determines the received data packet is not sent by the computer 10. For example, if the original MAC address in the received data packet sent by the computer 20 is "00D059AA4240," then block S305 is implemented.

In block S305, the transmitting module 43 transmits an ARP data packet to the computer 10.

In block S307, the checking module 42 checks if an ARP reply data packet has been received from the computer 10. If an ARP reply data packet has been received from the computer 10, the checking module 42 determines that the computer 10 is in a normal work status so that the modem 40 has to serve the computer 10, then block S309 is implemented, the checking module 42 drops the received data packet. Otherwise, if no ARP reply data packet has been received from the computer 10, block S311 is implemented.

In block S311, the checking module 42 checks if the received data packet is a DHCP data packet. It is understood that, in a DHCP data packet, there are two fields for recording the MAC address of a device that sends the DHCP data packet, one field is called "client identifier", another filed is called "client Ethernet address (chaddr)." While in other types of data packets, such as the ARP data packets, each data packet only has one field for recording the device that sends the data packet. If the received data packet is a DHCP data packet, block S313 is implemented. Otherwise, if the received data packet is not a DHCP data packet, the procedure goes to block S315 directly.

In block S313, the replacing module 44 replaces a MAC address recorded in the "chaddr" field of the received data packet by the MAC address of the computer 10. For example, the replacing module 44 replaces the MAC address "00D059AA4240" recorded in the "chaddr" field of the received data packet by the MAC address "00D059AB0301" of the computer 10.

In block S315, the replacing module 44 replaces an original MAC address in the received data packet by the MAC address of the computer 10, then the procedure goes to block S317, the transmitting module 44 transmits the received data packet with the replaced MAC address to the network server 60. Because the replaced MAC address is identical with the MAC address of the computer 10, the network server 60 regards the received data packet is sent by the computer 10 that has been allocated the IP address, so that when the computer 10 is shut down, other CPEs, such as the computer 20 can be connected to the Internet 50 by using the IP address of the computer 10.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A modem comprising:
   a storage card;
   at least one processor; and
   one or more programs stored in the storage card to be executed by the at least one processor, the one or more programs comprising:
   a receiving module operable to receive a data packet sent by a first computer connected to the modem;
   a checking module operable to check if an original media control access (MAC) address in the received data packet is identical with a MAC address of a second computer, which is connected to the modem and has an IP address allocated by a network server connected to the modem via the Internet, and determine the first computer and the second computer are the same computer if the original MAC address is identical with the MAC address of the second computer;
   a transmitting module operable to transmit the received data packet to the Internet in response that the first computer and the second computer are the same computer;
   the transmitting module further operable to transmit an address resolution protocol (ARP) request to the second computer in response to the original MAC address not being identical with the MAC address of the second computer;
   the checking module further operable to drop the received data packet if an ARP reply is received from the second computer, or determine the second computer is shut down if no ARP reply is received from the second computer; and
   a replacing module operable to replace the original MAC address in the received data packet by the MAC address of the second computer if the second computer is shut down, wherein the received data packet is regarded as being sent from the second computer and the first computer that sends the received data packet is connected to the Internet using the IP address of the second computer.

2. The modem as claimed in claim 1, wherein the checking module is further operable to check if the received data packet is a dynamic host configuration protocol (DHCP) data packet, and the replacing module is further operable to replace a MAC address recorded in a client Ethernet address (chaddr) field of the data packet by the MAC address of the second computer if the second computer is shut down and the received data packet is a DHCP data packet.

3. The modem as claimed in claim 1, wherein if the original MAC address in the received data packet is not identical with the MAC address of the second computer, the checking module determines that the first computer that sends the received data packet is a computer that has not been allocated an IP address.

4. The modem as claimed in claim 1, wherein the modem is selected from the group consisting of an asymmetric digital subscriber line (ADSL) modem, a symmetric digital subscriber line (SDSL) modem, and a cable modem.

5. The modem as claimed in claim 1, wherein the storage card is selected from the group consisting of a smart media card, a secure digital card, and a compact flash card.

6. A method for connecting a computer to the Internet using a modem, the method comprising:
   receiving a data packet sent by a first computer connected to the modem;

checking if an original media control access (MAC) address in the received data packet is identical with a MAC address of a second computer, which is connected to the modem and has an IP address allocated by a network server connected to the modem via the Internet;

transmitting the received data packet to the Internet if the original MAC address is identical with the MAC address of the second computer, or transmitting an address resolution protocol (ARP) request to the second computer if the original MAC address is not identical with the MAC address of the second computer;

dropping the received data packet if an ARP reply is received from the second computer, or determining that the second computer is shut down if no ARP reply is received; and replacing the original MAC address in the received data packet by the MAC address of the second computer if the second computer is shut down, wherein the received data packet is regarded as being sent from the second computer and the first computer that sends the received data packet is connected to the Internet using the IP of the second computer.

7. The method as claimed in claim 6, further comprising:
checking if the received data packet is a dynamic host configuration protocol (DHCP) data packet; and
replacing a MAC address recorded in a client Ethernet address (chaddr) field of the data packet by the MAC address of the second computer if the second computer is shut down and the received data packet is a DHCP data packet.

8. The method as claimed in claim 7, wherein if the original MAC address in the received data packet is not identical with the MAC address of the second computer, the first computer that sends the received data packet is regarded as a computer that has not been allocated an IP address.

9. The method as claimed in claim 7, wherein the modem is selected from the group consisting of an asymmetric digital subscriber line (ADSL) modem, a symmetric digital subscriber line (SDSL) modem, and a cable modem.

* * * * *